UNITED STATES PATENT OFFICE.

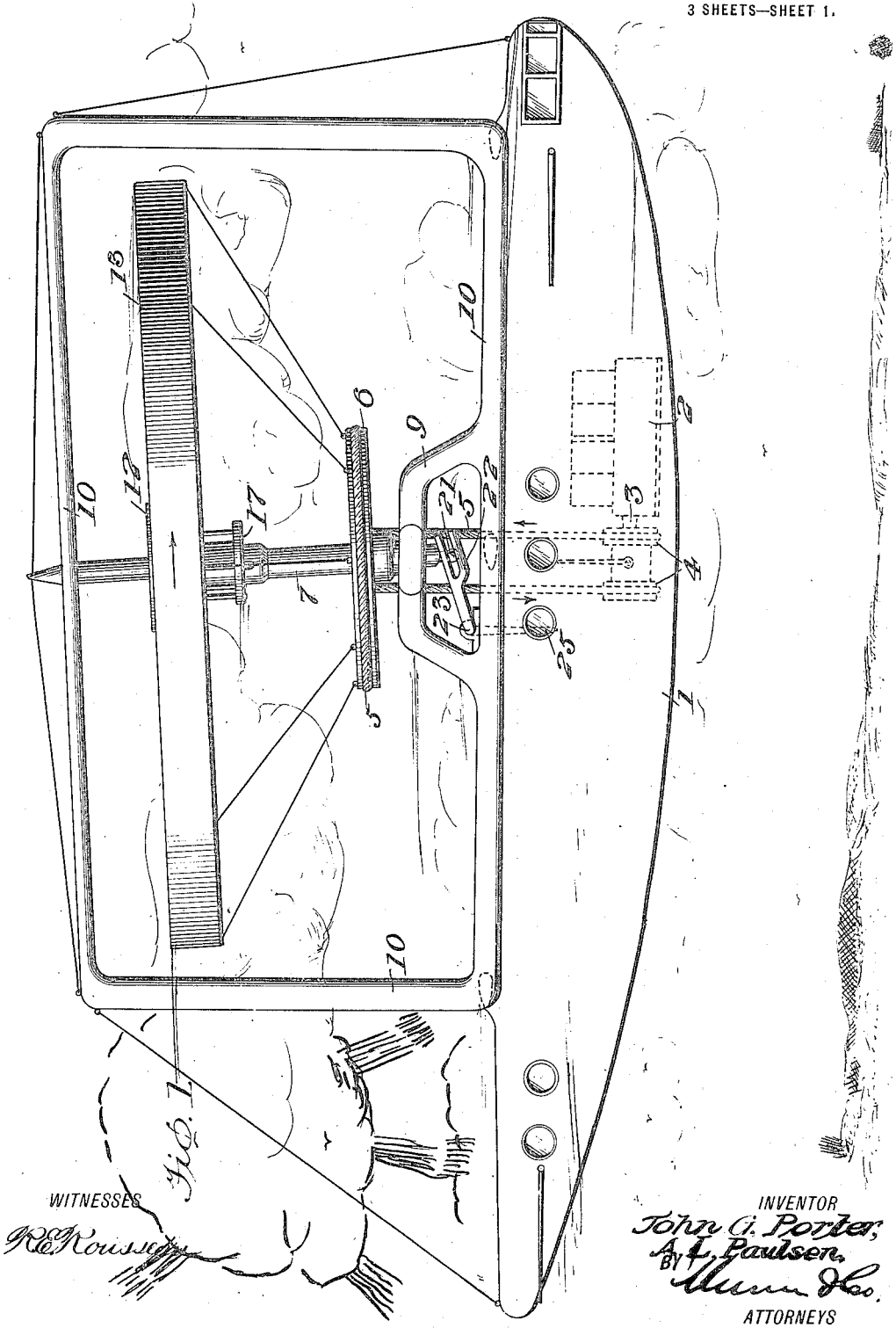

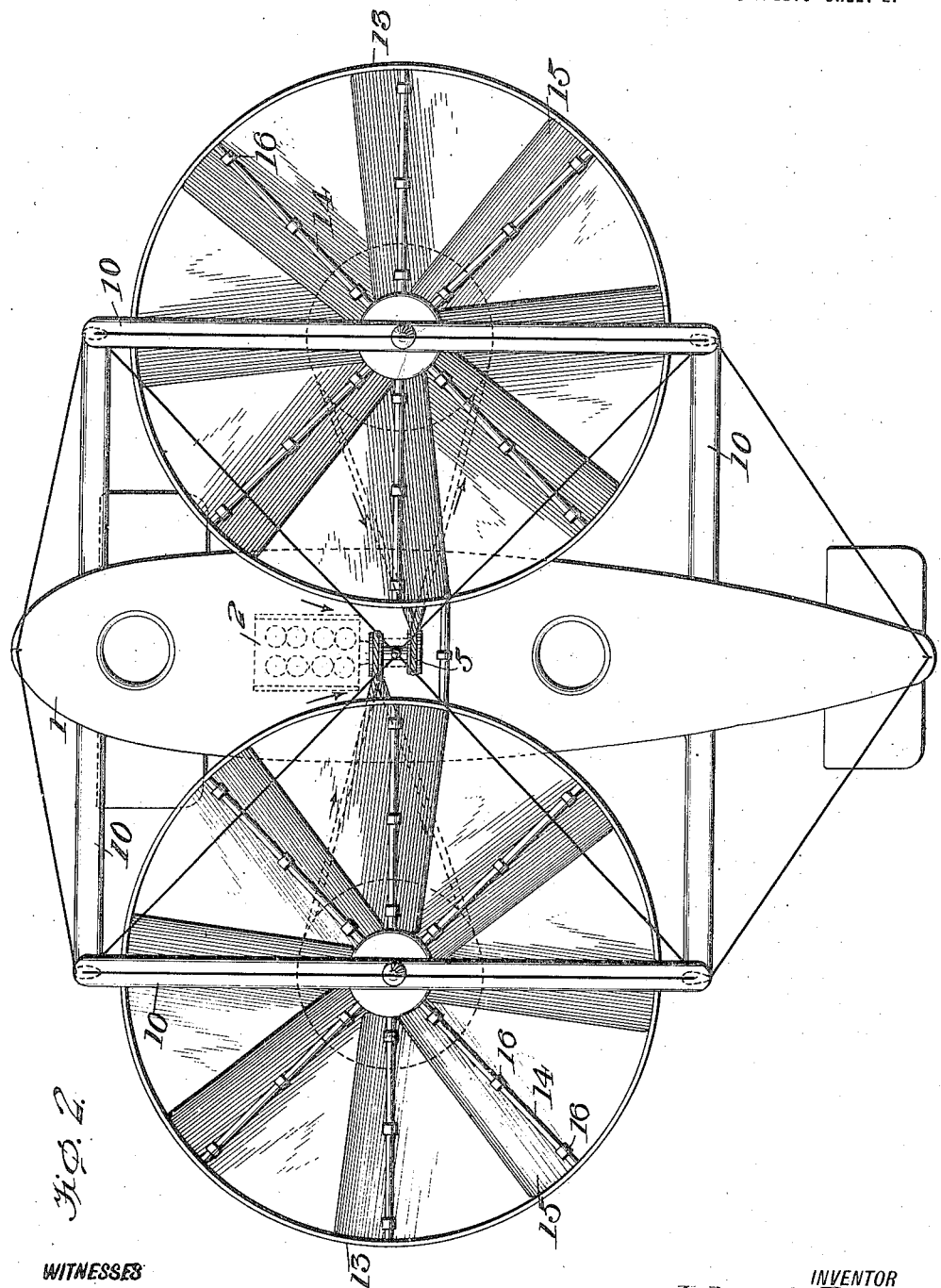

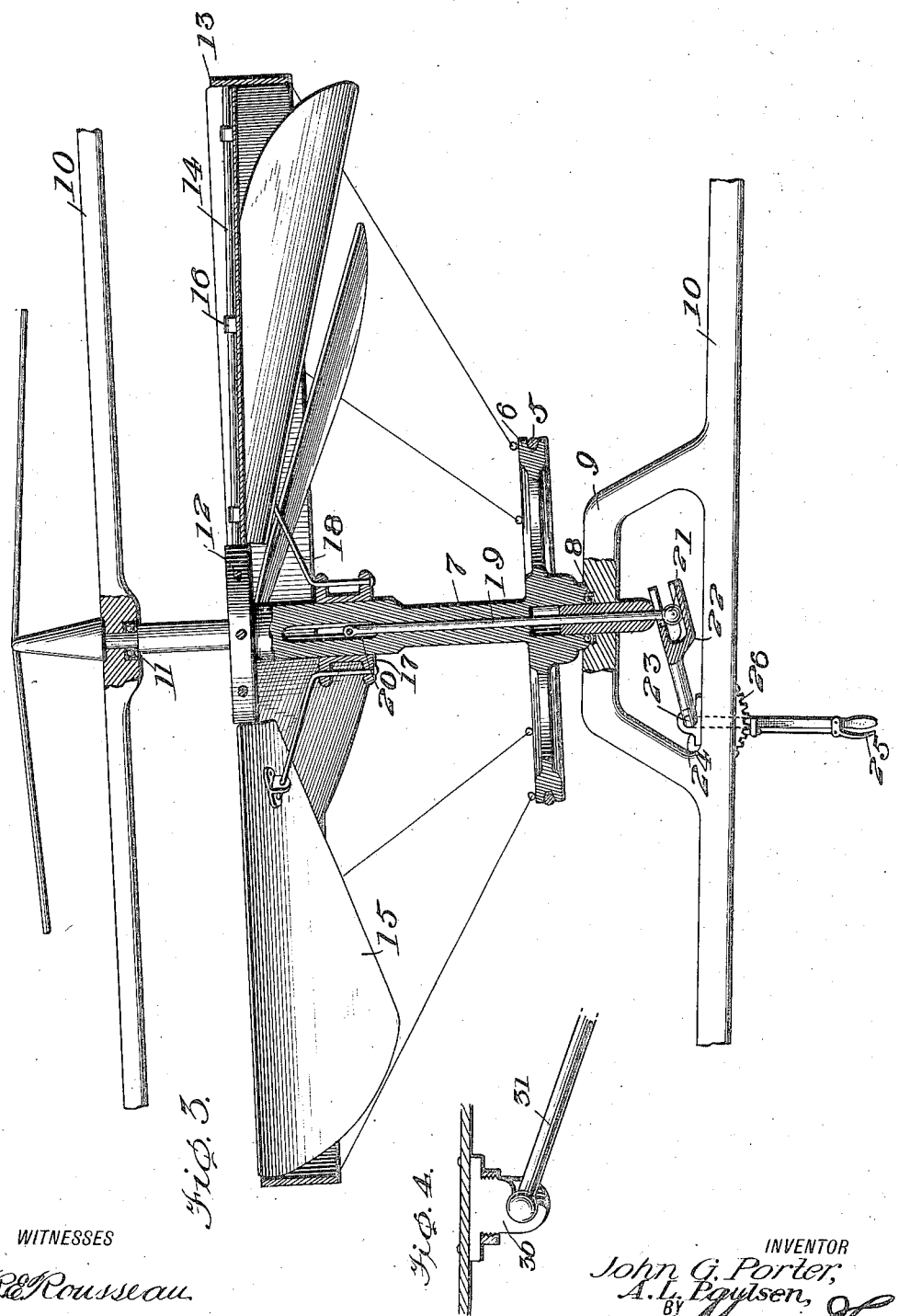

ALBERT L. PAULSEN AND JOHN GERALD PORTER, OF WEAVERVILLE, CALIFORNIA.

FEATHERING-WHEEL.

1,363,615.   Specification of Letters Patent.   Patented Dec. 28, 1920.

Application filed December 23, 1919. Serial No. 346,931.

*To all whom it may concern:*

Be it known that we, ALBERT L. PAULSEN and JOHN G. PORTER, citizens of the United States, and residents of Weaverville, in the county of Trinity and State of California, have invented certain new and useful Improvements in Feathering-Wheels, of which the following is a specification.

Our invention is an improvement in feathering wheels, and has for its object to provide a wheel of the character specified especially adapted for flying machines, by means of which the machine may be made to ascend or descend in a nearly vertical manner and to hover over a comparatively small area or to move forward in the manner of an aeroplane's flight.

In the drawings:

Figure 1 is a side view of a flying machine provided with the improved wheel;

Fig. 2 is a top plan view;

Fig. 3 is a longitudinal vertical section through one of the wheels;

Fig. 4 is a detail view showing a modified form of connection between the blades and the operating links.

The present embodiment of the invention is shown in connection with a flying machine consisting of a nacelle 1 in which is arranged a motor 2 having a shaft 3, to which is secured a pair of wheels 4, and these wheels are connected by flexible belts 5, cables in the present instance, with wheels 6 arranged on hollow shafts or posts 7. As shown, each of these hollow shafts 7 is supported at its lower end by a ball bearing 8 in a bracket 9 connected with the framework 10 of the machine.

This framework, as shown in Figs. 1 and 2, is a skeleton frame of cubical form, and the shafts 7 are journaled at their upper ends in the frame also, ball bearings 11 being interposed between the frame and the shaft.

In the present embodiment of the invention two feathering wheels are provided for supporting the machine, the said wheels being arranged on parallel axes. The shafts 7 to which the wheels are secured are arranged on opposite sides of the nacelle, in such manner that the planes of the wheels incline slightly downward from front to rear.

Each of the improved wheels comprises a hub 12 secured to the shaft, and a rim 13, which is connected to the hub by spokes 14. Blades 15 are hinged to the spokes, the blades having bearings 16 which engage the spokes, and it will be noticed, referring to Fig. 2, that the shafts or spokes 14 are nearer one edge of the blades than the other and have their axes parallel with the said edges instead of radial to the blades.

A collar 17 is mounted to slide on each shaft 7, and each collar is connected by links 18 with the blades of the adjacent wheel in such manner that when the collar is moved downward toward the nacelle the blades will have their pitch increased, while when the collar is moved upward the pitch of the blades will be decreased until they eventually lap upon each other, forming an imperforate wing.

Each collar is moved by means of a rod 19 which is arranged within the hollow shaft 7, and is connected at its upper end to the collar through slots 20 extending longitudinally of the shaft 7. The lower end of the rod has a ball 21 which is engaged within a socket 22 on one of the arms of a rock shaft 23, which is journaled in a bearing 24 on the frame 10. The other arm of the rock shaft is a lever, having latch mechanism 25 coöperating with a toothed segment 26 to hold the lever in adjusted position.

It will be noticed that the rim 13 of the feathering wheel is of considerable width, extending both above and below the blades when the blades are closed, the greatest depth, however, being below the plane of the blades. The cutting edges of the blades are hinged near the spokes, and the feathering of the blades is accomplished from the lower side. When the blades are entirely closed these depending rims present large disks with shallow depressions in their lower faces, the full size of the circle of the wheel, and when closed the wheels act as planes.

The planing or soaring effect of the wheel depends upon the depending rim. It will be understood that the wheels may be arranged in series, two, four or more, as may be desired, and the wheels of each pair rotate in opposite directions. Even when the wheels are not rotating they act as supporting planes for the machine.

It will be understood that, if desired, a tractor propeller may be provided for assisting in the forward motion, or any other form of propeller may be used, if it is found advisable, in connection with the propeller shown. In Fig. 4 there is shown a modified form of connection between the link 18 and the blades. In this arrangement each blade has a socket 30 which is engaged by a ball 31 on the link.

We claim:

1. In a flying machine, the combination with the nacelle, of a pair of wheels arranged above the nacelle and at opposite sides thereof, the planes of the wheels inclining forwardly and downwardly, means for simultaneously rotating the wheels in opposite directions, each wheel comprising a hub, a rim, and spokes connecting the hub to the rim, blades hinged to the spokes, means for simultaneously moving the blades to vary the pitch thereof, a shaft on which the hub is mounted, a sleeve mounted to move on the shaft, connections between the sleeve and blades, the moving means comprising a rod moving axially of the shaft and connected to the sleeve.

2. In a flying machine, the combination with the nacelle, of a pair of wheels arranged above the nacelle and at opposite sides thereof, the planes of the wheels inclining forwardly and downwardly, means for simultaneously rotating the wheels in opposite directions, each wheel comprising a hub, a rim, and spokes connecting the hub and the rim, blades hinged to the spokes, means for simultaneously moving the blades to vary the pitch thereof, a shaft on which the hub is mounted, a sleeve mounted to move on the shaft, connections between the sleeve and the blades, and means for moving the sleeve, the moving means comprising a lever connected with the sleeve, and having latch mechanism for holding it in an adjusted position.

ALBERT L. PAULSEN.
JOHN GERALD PORTER.